June 30, 1931. M. M. CLAYTON 1,812,198
APPARATUS FOR HEATING OR VAPORIZING FLUID
Filed June 4, 1927 4 Sheets-Sheet 2

Inventor
Mark M. Clayton
By Geo. B. Pitts
Attorney

June 30, 1931.   M. M. CLAYTON   1,812,198
APPARATUS FOR HEATING OR VAPORIZING FLUID
Filed June 4, 1927   4 Sheets-Sheet 3
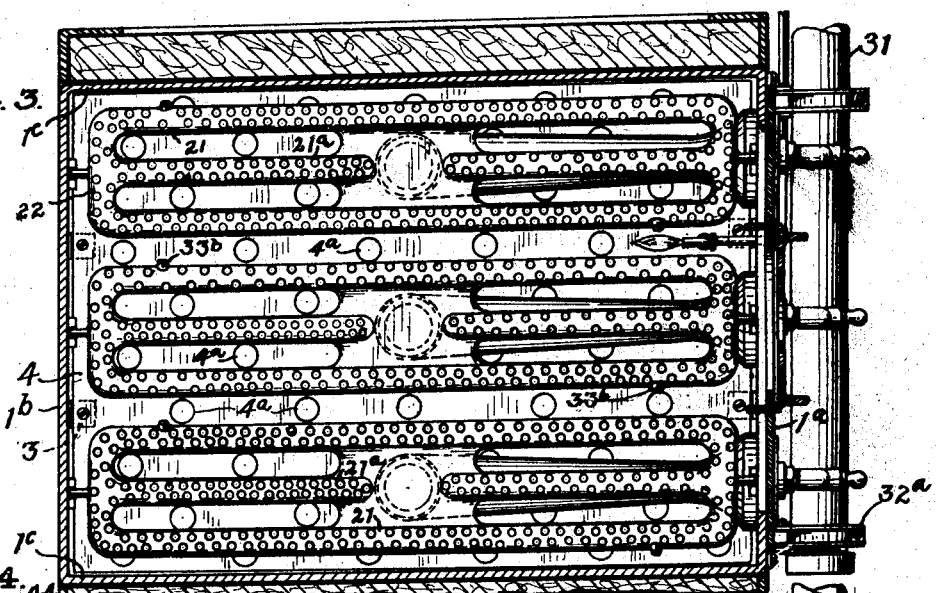
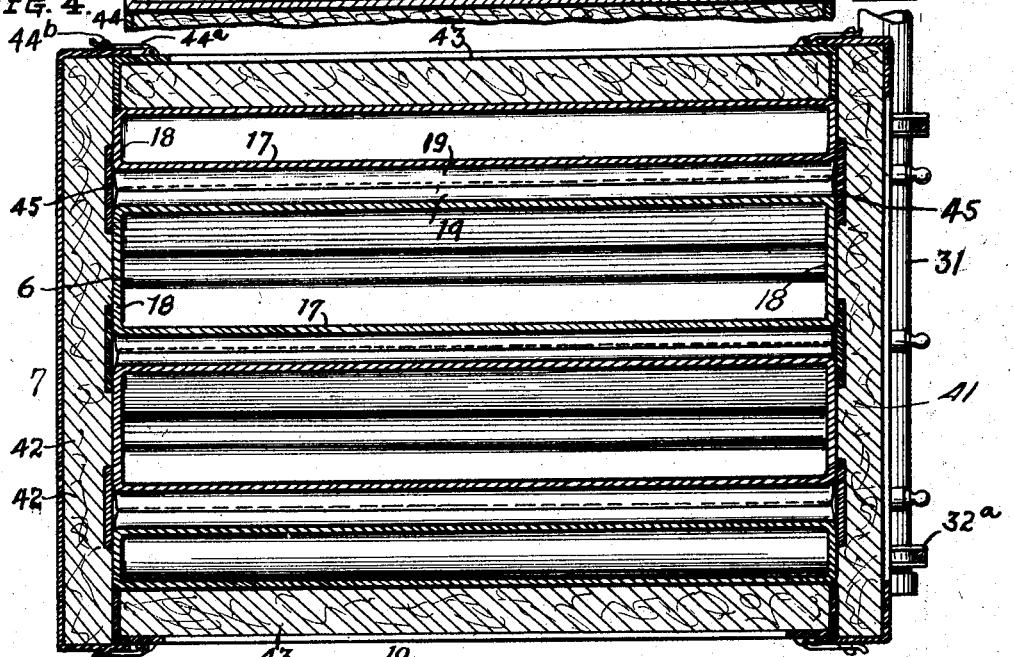
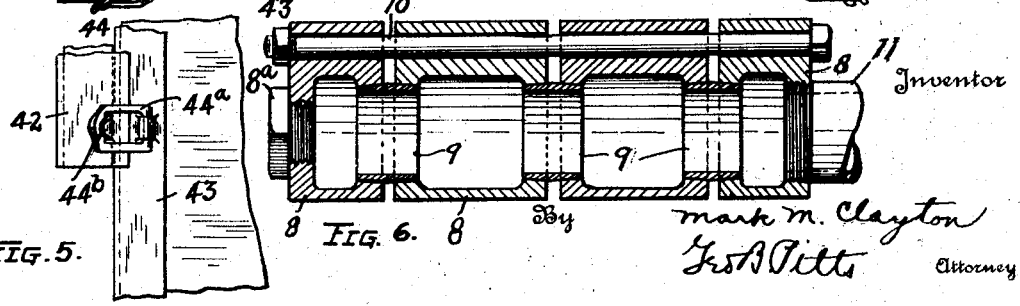

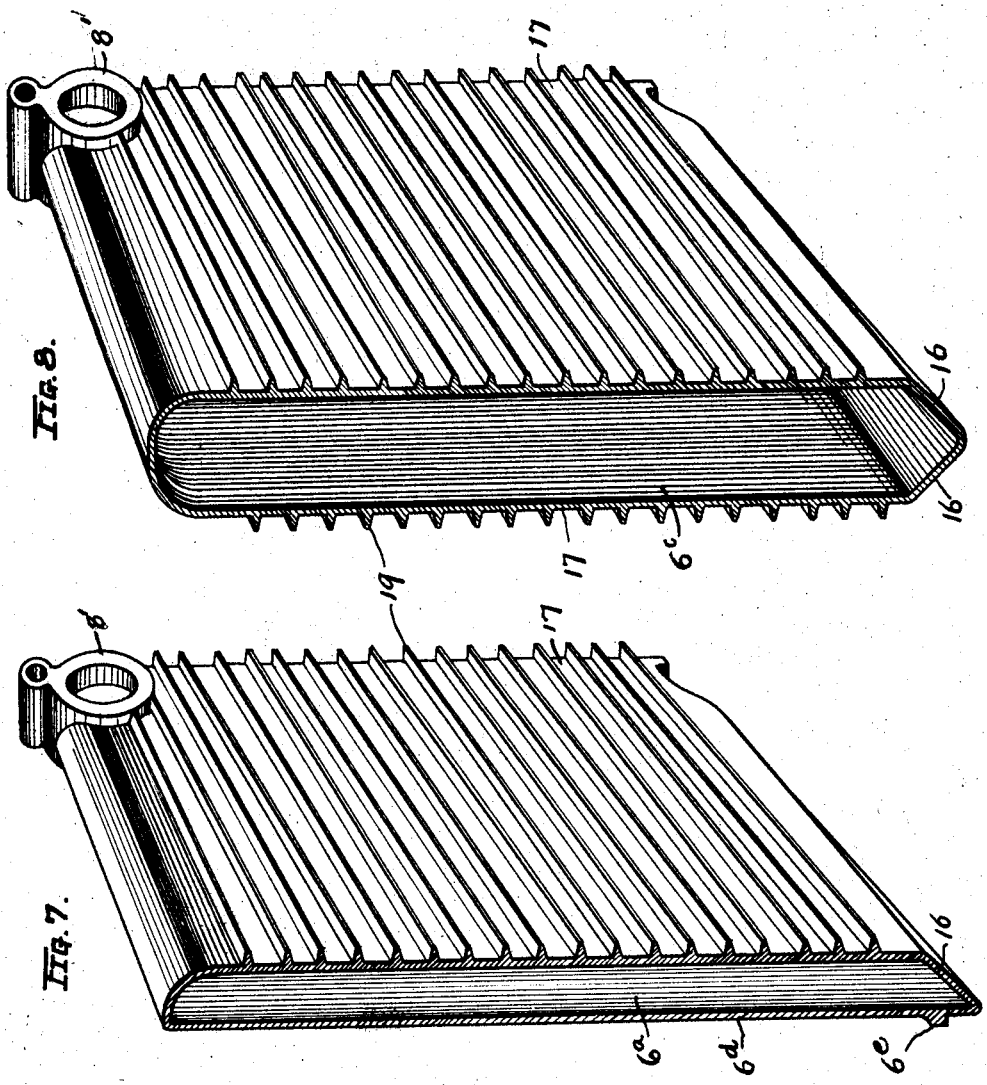

Patented June 30, 1931

1,812,198

UNITED STATES PATENT OFFICE

MARK M. CLAYTON, OF LA PORTE, INDIANA, ASSIGNOR TO BASTIAN-MORLEY CO., OF LA PORTE, INDIANA, A CORPORATION OF INDIANA

APPARATUS FOR HEATING OR VAPORIZING FLUID

Application filed June 4, 1927. Serial No. 196,606.

This invention relates to an apparatus for heating fluid. Where the fluid to be heated is water, as shown for example in the accompanying drawings, the apparatus may be used to heat water for a hot water heating system or steam either for heating or power purposes.

One object of the invention is to construct an improved apparatus of this character wherein the fluid has free and unobstructed circulation without resulting foaming, priming or liming effects.

Another object of the invention is to construct a fluid heater comprising spaced fluid containing sections and to provide the exposed walls thereof with heat absorbing devices arranged and related so as to effectively transfer heat from the products of combustion to the fluid, whereby the latter is rapidly heated.

Another object of the invention is to construct a fluid heating apparatus comprising spaced fluid containing sections and to provide on their opposed walls devices which serve to substantially increase the wall area to be heated and co-act to agitate the products of combustion as they ascend between the sections and deflect the gases alternately against the walls to be heated to maintain them free of inert or non-circulating gas films and bubbles of air and gas.

Another object of the invention is to construct a sectional type of fluid heater wherein provision is made for substantially vertical travel of the products of combustion and free and unobstructed circulation of the heated fluid within the sections and at the same time to increase the area of the surfaces exposed to the products of combustion as compared to the area of the surfaces in contact with the fluid, whereby a high percentage of the heat units in the products is absorbed while they travel through a relatively short distance, maximum difference in temperature between the opposite surfaces of the walls of the sections is maintained and priming and foaming of the fluid is eliminated.

Another object of the invention is to construct a sectional type of fluid heater that is relatively simple and easily assembled and capable of expansion to provide for any desired capacity.

Figure 1:
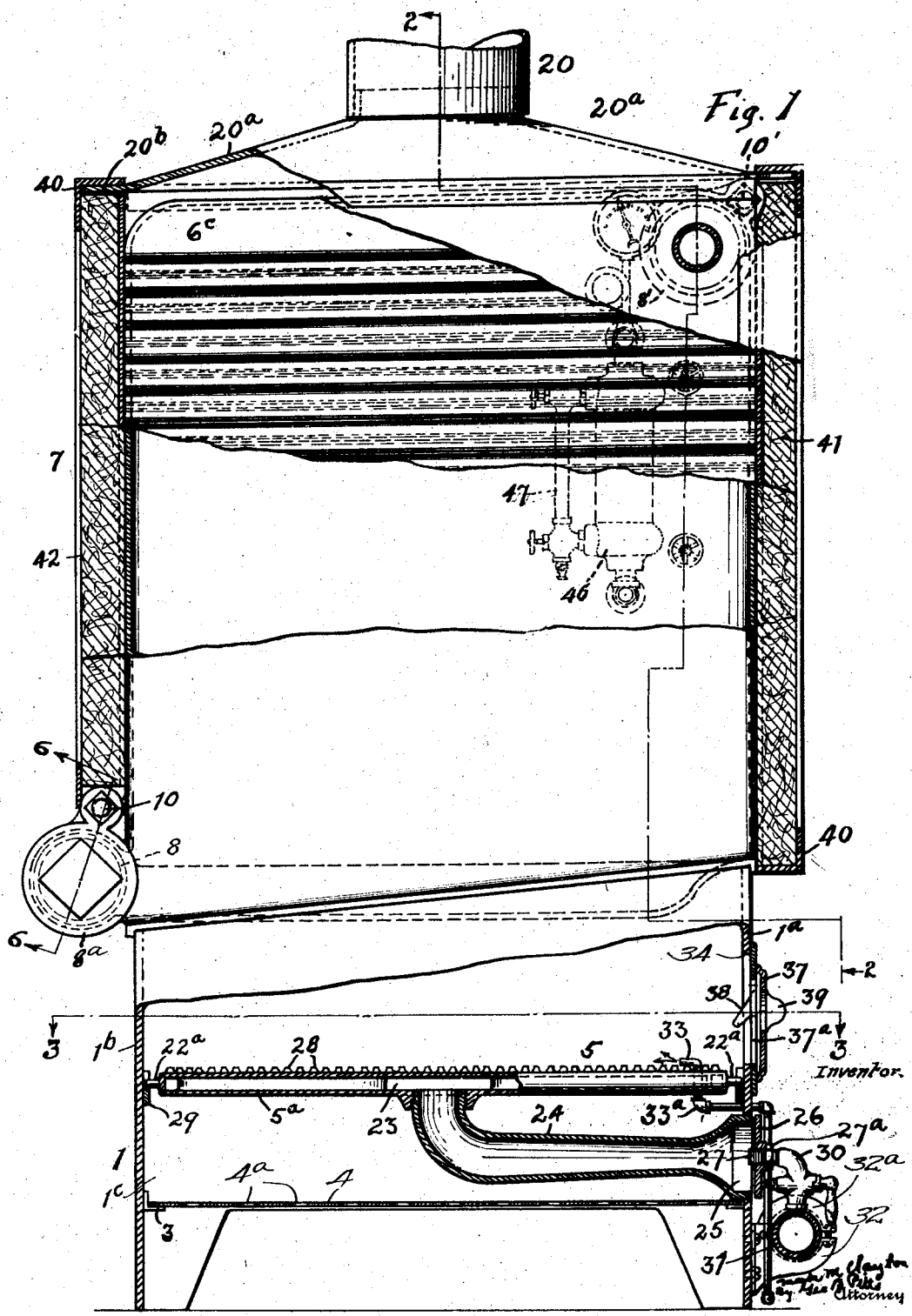
Figure 2:
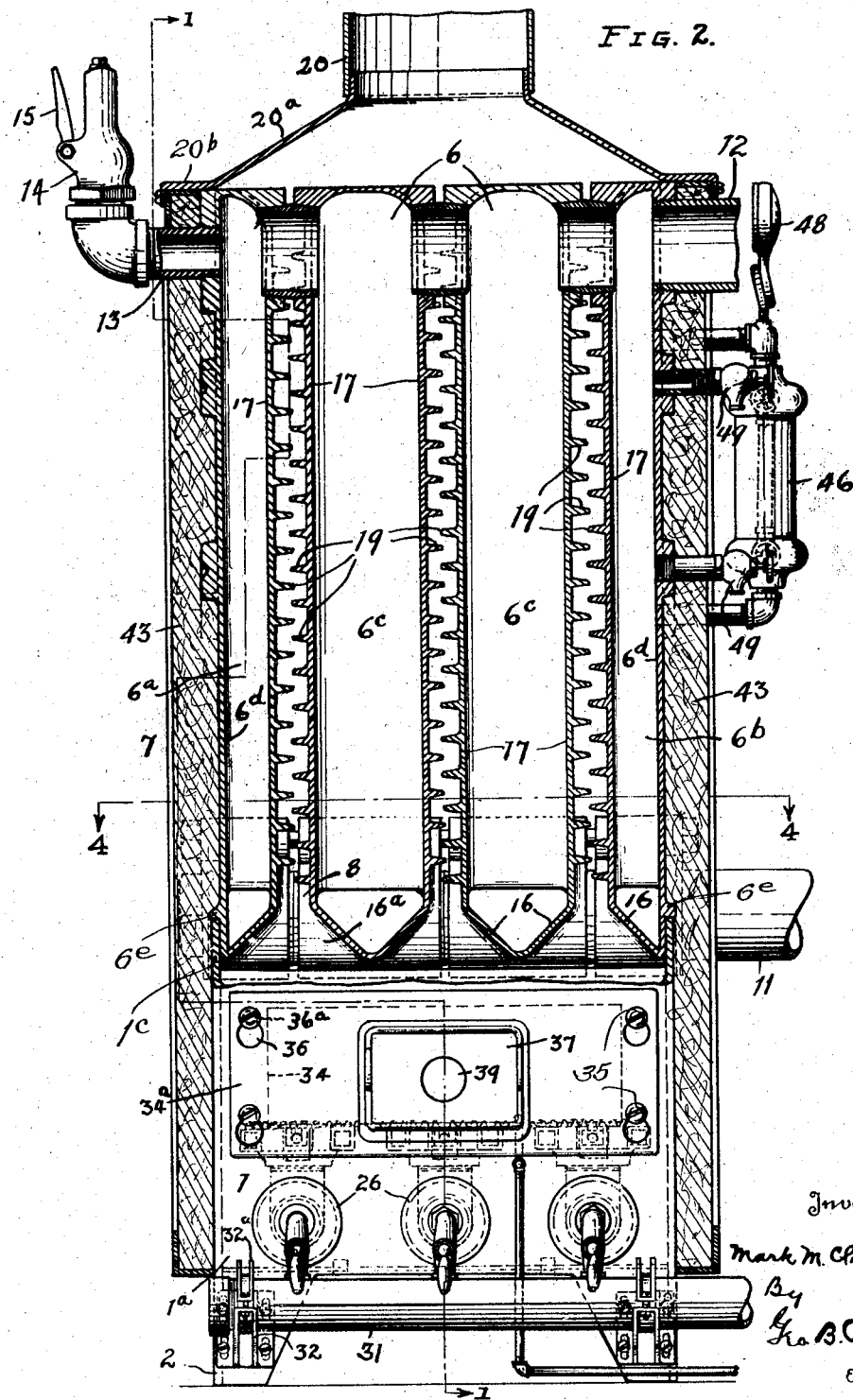

Other objects of the invention will be apparent to those skilled in the art to which my invention relates from the following description taken in connection with the accompanying drawings, wherein Fig. 1 is a view looking at the side of a heating apparatus embodying my invention, with parts thereof in section on the line 1—1 of Fig. 2.

Fig. 2 is a section on the line 2—2 of Fig. 1.
Fig. 3 is a section on the line 3—3 of Fig. 1.
Fig. 4 is a section on the line 4—4 of Fig. 2.
Fig. 5 is a fragmentary detail view.
Fig. 6 is a section on the line 6—6 of Fig. 1.
Fig. 7 is a perspective view of a portion of one of the end fluid containing sections.
Fig. 8 is a perspective view of a portion of one of the intermediate fluid containing sections.

In the drawings, 1 indicates as an entirety a support comprising a frame, preferably of rectangular shape, having a front wall 1a, a rear wall 1b and sides 1c. These walls may be cast integral or otherwise formed as desired. Portions of these walls at their corners may be shaped to provide suitable legs 2. The frame 1 is open at its upper end for reasons which will later appear. The space enclosed by the walls 1a, 1b and 1c constitutes a fire chamber, as will later appear. The front and rear walls at or near their lower edges carry aligned supports, such as angles 3, on which rests a plate 4. The plate 4 closes the lower end of the fire chamber to protect the heating means (indicated at 5 as an entirety) therein, but is formed with a plurality of openings 4a to supply sufficient air to the fire chamber to support combustion.

6 indicates a plurality of fluid containing sections disposed vertically side by side in spaced relation. In the present disclosure I have shown two end sections 6a, 6b, and two intermediate sections 6c, but it will be understood that there may be as many intermediate sections as desired dependent upon the desired quantity of hot water or steam required for each installation. Due to the fact that the sections 6c are similar in construction and the enclosing casing, indicated as an entirety at 7, may be removed (as will be later set forth) any installed apparatus may be readily changed to increase or decrease its capacity. Each intermediate section 6c rests at its front end on the front wall 1a and, at its rear end on the rear wall 1b and the end sections 6a, 6b, rest in a similar manner on these walls, and for additional support the outer wall 6d of each end section is provided with a longitudinal ledge 6e which engages with the upper edge of the adjacent side wall 7c. Each section 6a, 6b, 6c, at its lower rear end is provided with a relatively large hollow boss 8 (see Figs. 1 and 6) having aligned openings formed in their opposite faces and each in communication with the interior of the adjacent section. The openings between adjoining bosses are connected by suitable slip-joints or nipples 9 and these parts are held in liquid tight, rigid relation by a through bolt 10, extending through aligned openings formed in thickened walls of the bosses 8, as shown in Fig. 6. 11 indicates a supply pipe for water, leading from a supply system under pressure or the return pipe of a heating system or other suitable fluid supply. The pipe 11 may be connected to the boss 8 of either end section (for example the section 6b), the outer opening in the boss 8 of the other end section 6a being preferably threaded and closed by a suitable plug 8a. The bosses 8 are preferably arranged exteriorly of the walls of the sections 6a, 6b, 6c, to facilitate manufacture and also to eliminate possible obstructions to the free circulation of heated portions of the water or pockets to receive and retain precipitated foreign matter. Each section 6a, 6b, 6c, at its upper front end is provided with a relatively large hollow boss 8' in communication with the interior of the adjacent section. The bosses 8' are preferably connected together in a liquid tight, rigid relation by means similar to that shown and described for connecting the bosses 8. 12 indicates the outlet pipe or conduit for hot water or steam, as the case may be, leading to one or more points or stations for use. The pipe 12 is preferably connected to the same end section (6b) as that to which the pipe 11 is connected. The outer opening in the boss 8' for the other end section (6a) is threaded to receive the inner end of a pipe 13 and this pipe may carry a suitable automatic safety valve 14, which may be manually operated by a handle 15. The bosses 8' (as will be understood from Figs. 1, 7 and 8) are disposed at the corners of and within the top and front end walls of the fluid containing sections and the thickened walls for the connecting rod 10' are on the upper portion of the bosses 8'. This arrangement positions the bosses and their connecting nipples in the path of the products of combustion traversing the spaces between the sections and within the insulating jacket 7, so that the temperature of these parts is maintained to prevent heat losses in the generated steam or hot water as the case may be. It will be understood that the sections 6a, 6b, 6c, may be positioned on the supporting walls 1a, 1b, at any desired distance one from the other dependant upon the restriction desired between the opposing walls of the sections for the products of combustion as they ascend; such spacing or relation being effected by the use of nipples of the proper length. The bottom wall of each section 6c is formed by two downwardly and inwardly inclined portions 16 which meet and are connected together in the central longitudinal plane of the adjacent section. In this form of construction one bottom portion 16 co-acts with a similar but oppositely inclined portion 16 of the adjoining section to form a throat 16a for the products of combustion leading to the space between these sections. The end sections 6a, 6b, are preferably constructed as half sections of the intermediate sections 6c to facilitate the making and use of patterns, for their manufacture. In this arrangement, each end section 6a, 6b, is provided with one bottom portion 16 which is connected to the lower end of the outer wall 6d. As will be understood from Figs. 4, 7 and 8, the heated side walls 17 and the end walls 18, of each section 6a, 6b, 6c, have vertical, planular inner surfaces with which the fluid therein contacts to absorb heat, such surfaces providing for free unobstructed circulation upwardly of the heated portions of the fluid and hence tending to maintain or insure a rapid current of such portions and also prevent the accumulation of air bubbles on such surfaces as well as eliminating liming thereon. 19 indicates a plurality of heat absorbing members on the exterior surfaces of the walls 17, these members preferably being formed integrally therewith and projecting laterally therefrom, the purpose being to increase the heated wall area exposed to the products of combustion rising vertically in the spaces between the fluid containing sections 6a, 6b, 6c, so that in their travel through a relatively short distance, a relatively high percentage of the heat units in the products of combustion may be absorbed by these members and the walls 17 and transferred through the latter to the fluid. By providing for a free and unobstructed circulation of the heated water within the sections the inner surfaces of the walls are maintained at a relatively low temperature as compared to the temperature of the outer surfaces thereof. As a result of this temperature difference, the transfer of heat through the walls 17 is rapid and enables the heat absorbing members to rapidly absorb a high percentage of the heat units contained in the products of combustion, so that in the short travel of the latter high efficiency in heating results. As shown, the heat absorbing members 19 extend horizontally, being preferably continuous from end to end of each section and the upper and lower surfaces of each taper or converge toward its free end. In the preferred arrangement, the heat absorbing members 19 on one wall 17 are out of alignment with those on the opposing wall 17, so that the members on opposing walls are in staggered relation; also, the free ends of the members on one wall overlap the free ends of the members on the opposing wall as will be understood from Figs. 2 and 4. In this arrangement, the heat absorbing members 19 cause an agitation of the products of combustion as they travel upwardly and a deflection thereof to prevent the accumulation on the walls 17 of a non-circulating gas film or bubbles of air and gas which would prevent the efficient heating of these walls.

20 indicates a flue having an enlarged portion 20a engaging the upper end walls of the jacket 7 and arranged to receive and carry off the products of combustion after passing through the spaces between the fluid containing sections. As shown, the upper ends of the spaces open into the enlarged flue portion 20a.

The heating means 5 may comprise any desired form of fuel, such as coal, oil or gas, preferably the latter. For the use of gas, I provide a plurality of heating units or burners 5a one in associated or operative relation to each passage or space between adjoining sections or the throat 16a leading thereto. Each burner 5a comprises three longitudinally extending, spaced gas distributing bars 21, 21, 21a, and end gas distributing bars 22 to which the outer ends of the longitudinal bars are connected. The central portions of the bars merge into a chamber 23 (see Fig. 1) and the bottom wall of this chamber is formed with a threaded opening into which is fitted the inner end of a supply tube 24. The outer end of the tube 24 is enlarged to form a mixing chamber 25. The mouth of the mixing chamber has associated with it an adjustable plate 26 to increase or decrease the supply of air to the mixing chamber. The plate 26 is formed with a hub which is threaded on the end of a gas inlet pipe 27 the free end of which supplies gas within the chamber 25, whereby the plate may be moved toward and from the open end of the mixing chamber, a nut 27a serving to lock the plate in adjusted position. The upper walls of the bars 21, 21a, 22 are formed with a plurality of hollow bosses 28, which form gas jets or ports for the burner. The bars 22 are provided with projections 22a which engage suitable seats 29. As shown in Fig. 3, the central or intermediate distributing bars 21a of each burner 5a are in line with a vertical plane disposed centrally of the adjacent space between the adjoining sections and that the side distributing bars 21 of the burner are spaced an equal distance from the bars 21a and the adjacent bars 21 of the burners 5a at either side of the burner. In this form of construction it will be seen that (1) the bars 21a of each burner are below one of the conduit spaces and the side bars 21 are below the inclined portions 16 of two adjoining sections, so that the heat and products of combustion from each burner are guided by the walls of the adjacent throat 16a into the space connected thereto and (2) while the burner jets 28 of each burner are related to the throat and space above it the rows of burner jets of the several burners are uniformly spaced from side to side of the fire chamber to provide an even distribution of the products of combustion and radiant heat into the conduit spaces. Each pipe 27 preferably comprises the nozzle portion of a suitable cock 30, the inlet end of which is threaded into a main supply pipe 31 common to all of the cocks 30. The pipe 31 extends along the front wall 1a below the mixing chambers 25, being supported on this wall by brackets 32 having semi-circular seats for the pipe and a semi-circular cap 32a hinged at one end on the bracket and removably secured thereto at its opposite end to hold the pipe in position.

33 indicates a pilot associated with one or two of the burners 5a. The pilot has a jet end to which a supply pipe 33a is connected. This pipe leads through the wall 1a, and then downwardly to one side of the main supply pipe 31, and then parallel thereto to a point beyond the control of the gas through the pipe 31, it being understood that the supply of gas through the pipe 31 may be automatically controlled by the temperature of the fluid in one of the fluid containing sections, or otherwise as desired; also a suitable control of the gas supply through the pipe 31 arranged to cut off such supply upon the pilot flame becoming extinguished, may be provided. The opposite sides of each burner 5a are provided with jets 33b which form auxiliary pilots to light one burner from adjoining burner; this arrangement making it unnecessary to provide more than one main pilot.

The front wall 1a is formed with an enlarged opening 34 to permit access to the fire chamber and to enable the assembly or removal of the burners 5a. This opening is closed by a door or cover 34a supported on the wall 1a in the following manner: the wall 1a carries a plurality of studs 35 having enlarged heads and the door 34a is formed with openings 36 and branch slots 36a. The openings 36 are of a size to permit the stud heads to pass through them when the door is positioned against the wall 1a. When the door 34a is thus positioned, it may be moved in a lateral or edge-wise direction to let the studs 35 enter the branch slots 36a. This latter movement positions portions of the door 34a behind the stud heads so that the latter hold it on the studs and against the wall 1a. To permit of access to the pilot 33, I prefer to provide the door with a shutter 37 suitably related to an opening 37a formed centrally of the door. The shutter 37 may be held in closed relation to the opening by a pair of arms 38 extending inwardly and engaging the end walls of recesses formed in the door 34a. The shutter 37 may be provided with a suitable window 39.

The jacket 7 comprises sections of suitable insulation material, such as hair, rock wool, asbestos or other material. The exposed surface of each section is covered with a material which takes paint or other finishing material and the longitudinal and side edges of each section may be bound with a sheet metal angle piece 40. The jacket 7 comprises (a) an insulation section 41 in front of the sections 6a, 6b, 6c, and in engagement with their front end walls 18, extending from the top walls thereof to their bottoms or to the upper edge of the wall 1a; (b) an insulation section 42 at the rear of the sections and in engagement with their rear end walls 18, this section extending from the top walls of the section to the bosses 8; and (c) insulation sections 43 each in face to face relation with the wall 6d of the adjacent end section and extending from the top thereof downwardly, preferably to a point co-incident with the plate 4. The sections 41, 42 and 43 are removably held in position with their opposite ends abutting, as shown in Fig. 4, by a plurality of connectors 44 and in interlocking relation with the outer edge portions of the flue members 20a. As shown in Fig. 1, the free outer portion 20b of the flue member 20a extends outwardly between the end edge of the insulating material and the horizontal portion of the adjacent angle plate 40, this arrangement being continuous along each side of the member 20a and the insulation sections 41, 42 and 43, so that the insulation sections are supported by the flue member.

Each connector 44 may comprise a member 44a hinged on one insulation section and removably engaging a lug or latch 44b on the adjacent section. In Fig. 4 I have shown on each section 43 a hinged member 44a at each end thereof and latches on the adjacent ends of sections 41, 42. I prefer to provide two or more connectors 44 along each of the abutting ends of the sections. The connectors 44 serve to hold the insulation sections in engagement with the fluid containing sections and in abutting relation to each other and also to hold the strips 40 along their upper edges in overlapping relation with the wall portions 20b of the flue member 20a, so that the fluid containing sections are completely enclosed and sealed to prevent the escape of heat and products of combustion.

In the arrangement above described, it will be noted that the insulation sections 41 and 42 close the spaces between the fluid containing sections along their ends. It will also be noted that the insulation sections are in engagement.

45 indicates metal plates bridging the conduit spaces between adjoining fluid containing sections at the opposite ends thereof. These plates serve to prevent contact of the products of combustion as they travel upwardly through the conduit spaces with the adjacent insulation sections 41, 42. The plates 45 may be countersunk in the insulation material as shown in Figs. 2 and 4. It will be noted that the fluid containing sections are so constructed and arranged and the sections of the jacket related thereto so as to prevent contact of the products of combustion with the latter, the plates 45 serving to prevent such contact even along the ends of the conduit spaces. Accordingly only a slight difference in temperature exists between the inner and outer surfaces of the jacket so that the transfer of heat therethrough is reduced to a minimum. As a result, I am enabled to use jacket sections that are relatively thin. Furthermore, from the foregoing description it will be understood that the jacket sections 41, 42 and 43 are removable. This enables me to remove the front and rear sections or panels thereof for access to the exterior walls of the fluid containing sections 6a, 6b, 6c, and the heat absorbing devices thereon. As these devices are straight and horizontally disposed, cleaning of the surfaces of such devices and the exterior surfaces of the walls 17, upon removal of the panels 41 and 42, or either thereof may be readily effected.

46 indicates a water column suitably mounted on the wall 6d of one end section and connected therewith in the usual manner. The column 46 is provided with a water gage 47 and a pressure gage 48. 49 indicates trycocks also mounted on the wall 6d.

The flue 20 and its enlarged portion 20a may be formed from suitable non-corrosive material; also the fluid containing sections 6a, 6b, 6c, may be cast or otherwise formed from a material or suitable alloy having a high co-efficient of conductivity and likewise the heat absorbing members may be formed integrally with the side walls of these sections to insure a rapid conduction of the heat units therethrough.

Due to the fact that high percentage of the heat units contained in the products of combustion is absorbed by and transferred through the walls of the sections 6a, 6b, 6c, the travel of the products of combustion is relatively short and as a result the entire apparatus may be compact in size without affecting its efficiency.

It will also be noted that the interior and exterior walls of the sections are constructed to permit both the fluid in the sections and the products of combustion in the conduit spaces between them to flow upwardly without being diverted in lateral horizontal directions. This form of construction enables the water and products to take their natural paths of flow and this tends to eliminate liming effects within the sections and the adhesion of non-circulating gas films to the exterior surfaces thereof.

It will be understood that (a) suitable devices dependent on the room temperature or the temperature of the fluid within the sections, or both may be provided for automatically controlling the supply of combustible medium to the burners and (b) suitable safety devices dependent on the steam pressure or water level or both, when abnormal conditions thereof prevail, and also on the burning and non-burning of the pilot may be provided for automatically shutting off the supply of the combustible medium. These devices, which may be of the electric type, are not shown, as they form no part of the present invention.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting.

What I claim is:

In a fluid heater, the combination of a fire chamber, a plurality of fluid containing sections disposed in spaced side by side relation, a discharge flue above said sections, the spaces between said sections being in communication with said fire chamber and said flue, said fluid containing sections having on their opposing walls integral solid fins to reduce liming, said fins being closely spaced apart on their respective walls and disposed with the fins of one section vertically offset a distance equal substantially to the horizontal depth of the fins from the fins of an adjacent section to deflect the gases toward the wall of the opposing section, the fins of one section slightly overlapping at their outer ends the outer ends of the fins of an adjacent section to decrease the tendency of pocket forming and prevent stratification on the surfaces.

In testimony whereof, I have hereunto subscribed my name.

MARK M. CLAYTON.